July 11, 1967

C. L. HABERN ETAL 3,330,154

APPARATUS FOR MEASURING THE RESULTANT LOAD ON
A STATIONARY SHAFT

Filed Jan. 12, 1965

INVENTORS
Calvin L. Habern
William D. Jobe

BY Thomas A. Harwood

July 11, 1967  C. L. HABERN ETAL  3,330,154
APPARATUS FOR MEASURING THE RESULTANT LOAD ON
A STATIONARY SHAFT
Filed Jan. 12, 1965  3 Sheets-Sheet 2

INVENTORS
Calvin L. Habern
William D. Jobe
BY Thomas A. Harwood
ATTORNEY

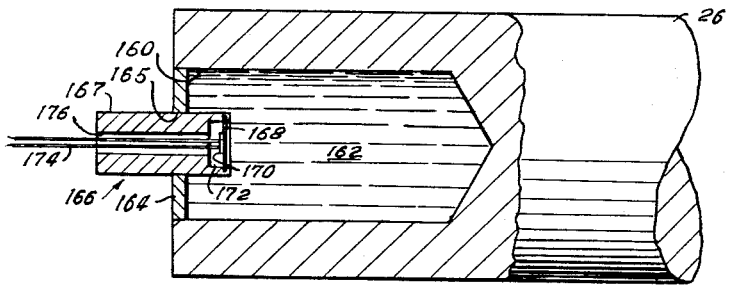
Fig. 12
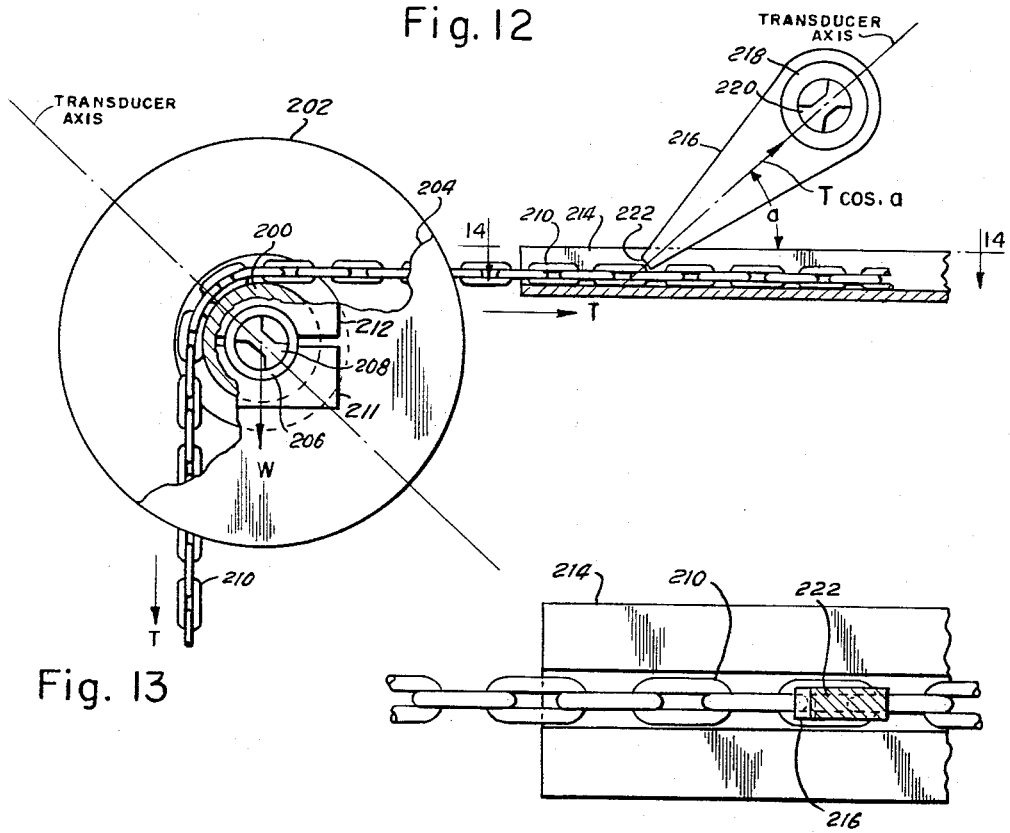
Fig. 13
Fig. 14
INVENTORS
Calvin L. Habern
William D. Jobe
BY *Thomas G. Harwood*
ATTORNEY 3,330,154
APPARATUS FOR MEASURING THE RESULTANT LOAD ON A STATIONARY SHAFT
Calvin L. Habern and William D. Jobe, Dallas, Tex., assignors to Sigma Systems Corporation, Dallas, Tex., a corporation of Texas
Filed Jan. 12, 1965, Ser. No. 424,937
5 Claims. (Cl. 73—143)

This invention relates generally to the measurement of the resultant load exerted upon a stationary shaft caused by external forces acting on the exterior thereof. More particularly, it relates to the measurement of the resultant load exerted on a stationary shaft caused by external forces acting thereon as a result of any mechanical member bearing on the shaft, such as, for example, in the case where a stationary shaft is inserted through and supports a rotatable member. Such apparatus has application to the measurement of the tension in a cable or chain carried on a winch drum, to the measurement of pressure on a printing drum, and many other applications.

In off-shore drilling operations, for example, floating platforms are widely used from which all of the drilling apparatus is mounted and on which the crews can work. These platforms, although they are designed to float, have to be suspended over the drilling hole and maintained in the proper position, regardless of tides, winds, and any other external forces which would tend to cause the platform to move. It is common practice in this work to utilize several chain or cable winches, whereby anchors are connected to the cables or chains and imbedded in the ocean floor, and by maintaining the proper tension on the cable or chain, the floating platform may be stabilized in a predetermined position regardless of ambient weather or ocean conditions. The proper tension is maintained by operating the winch in one or more of its several modes of operation, such as the hauling mode when winding in the cable, the braking mode when stopping the winch after the cable is let out, and sometimes the pawl insert mode where a pawl is inserted in the cable drum or in the chain to prevent the cable or chain from being reeled out further. It is, therefore, apparent that an effective and expedient means of measuring the tension in the cables or chains is necessary for proper stabilization of the platform. For example, as the platform tends to move in response to some exterior force, the tensions in the various cables will vary accordingly, and by accurately measuring these tensions, the winches can be actuated at the proper time to reel out or take in more cable to maintain stability.

Winches utilized for the above purpose are characterized by a relatively large drum about which the cable is wound or over which a chain passes. These drums are supported for rotation on a stationary shaft passing through the center of the drum along its axis of rotation, wherein the shaft is rigidly mounted at both ends between mounting blocks. The mounting blocks are rigidly mounted to the base supporting structure of the winch, and the supporting structure is secured to the deck of the platform. Although many devices and apparatus have been devised to effectuate the measurement of the tension in the cables or chains of such winches, most, if not all, involve a considerable amount of complex apparatus which cause inaccuracies in the measurement of tension and require a considerable and frequent amount of adjustments and maintenance. Moreover, most systems are expensive to install and require a considerable number of man hours to maintain and operate.

In accordance with the present invention, a very simple, economic and accurate apparatus is provided for measuring the tension in the cables or chains of an off-shore platform winch, wherein little or no maintenance is involved and a single operator can make the desired measurement and control the tension in the cables. The rotating drum which carries the cable or chain and is supported by the stationary shaft bears on the shaft with a net resultant force directly proportional to the tension in the cable or chain and measurement of the net resultant force acting on the shaft is a measurement of this tension. The prevent invention utilizes this fact, wherein one or both ends of the stationary shaft is drilled out to form a cavity in the end thereof, and a suitable strain responsive means is installed within the cavity to measure the strain on the shaft caused by external forces acting thereon. Preferably, the strain responsive means is an electrical transducer, such as, for example, a foil or semiconductor strain gage mounted on a suitable supporting member, to produce an electrical output signal which is proportional to the deflection of the cavity. This signal can then be coupled to suitable circuitry and meters calibrated in terms of units of tension in the cables and adapted to control the drive on the winches themselves to control the tension at the desired level. It will at once be recognized that this apparatus is effective to measure the tension in the cable or chain regardless of the operational mode of the winch. A further primary advantage of this system is its reliability, which is apparent from the fact that no moving parts are involved in the means for measuring the tension. The reliability is further enhanced by the fact that wide variations in temperature have little effect, if any, on the results, and the fact that there are no leakage or freezing problems present, such as found in hydraulic tension systems. In fact, this system is essentially all electric and all component parts, in which there are only a few, can be protected from any corrosion effects.

Although the above application of the invention relates to its utilization in conjunction with off-shore drilling platform winches, it will also be recognized that the invention is applicable to many other applications, such as, for example, the measurement of pressure on a roller drum used for printing wherein the printing drum is also suspended for rotation about a dead shaft, its use in conjunction with stationary winches for barges and dredges, crane winches for crane load measurements, and stationary coupling pins for other load measurements. Other objects, features and advantages will become readily apparent from the following detailed description when taken in conjunction with the appended claims and the attached drawing wherein like reference numerals refer to like parts throughout the several figures, and in which:

FIGURE 12 is a side elevational view, partly in section, of still another embodiment of a strain responsive means mounted disposed in a cavity of a shaft of the type described;

FIGURE 13 is a side elevational view, partly cut away, illustrating a chain type winch, wherein a chain passes over a winch drum and utilizes a pawl for holding the chain in tension, and wherein strain responsive means are mounted in stationary shafts supporting both the drum and pawl; and FIGURE 14 is a top view of the chain of FIGURE 13 passing through a channel with the pawl inserted in the chain.

Figure 1:
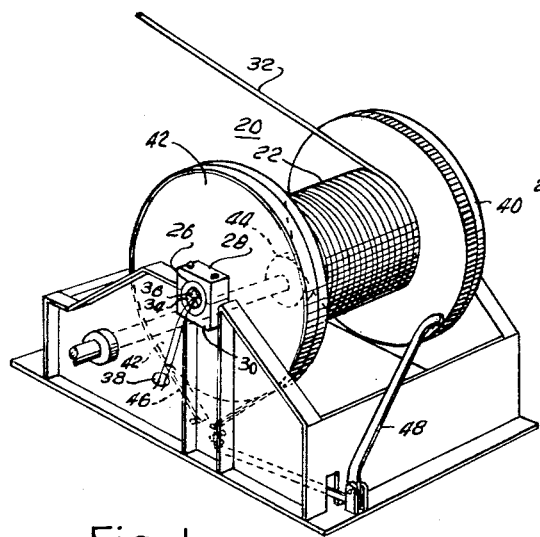
FIGURE 1 is a perspective view of a cable winch, such as is used on a floating off-shore drilling rig, and shows a strain responsive means mounted within a cavity provided in the end of a stationary shaft about which the cable drum is supported for rotation.

Referring now to FIGURE 1, there is shown a cable winch 20 comprising a rotating drum 22 about which is wound a cable 32 for being reeled on and off the drum. The cable drum rotates about a stationary shaft 26 that is rigidly supported at each of its ends between mounting blocks, such as mounting blocks 28 and 30 shown on one side of the shaft. Depending upon the type of operation and the use to which the winch system is adapted, the cable is held in tension from the cable drum at a predetermined angle with respect to the horizontal. In this particular case where the winch is used on an off-shore platform to anchor the platform by means of the cable being attached to an anchor, the cable 32 is oriented at a small positive angle with respect to the horizontal. It should be understood, however, that the cable can come off at any one of a number of angles, depending upon the particular application of the winch, and that the particular angle of the cable has no bearing on the operability of the invention to be described. It will be readily apparent that the cable 32 is held in tension between its anchor and the winch itself, wherein the measurement of this particular tension comprises the subject matter of the present invention. Knowing the tension at any one instant of time provides the necessary information as to whether the drum should be actuated to reel in more of the cable or let it out, so as to maintain the desired tension in the cable and to maintain the floating platform substantially stationary.

According to the present invention, the tension in cable 32 is measured by means of a suitable strain responsive means or transducer located in a cavity of the stationary shaft about which the cable drum rotates. To accomplish this, one or both of the ends of the shaft is drilled out to form a hole or cavity 34, and a suitable transducer 36 is force fitted into the cavity so that the transducer bears against the sides thereof. Preferably, the transducer produces an electrical output in response to mechanical strain, and therefore, electrical leads 38 are provided to the transducer from which the desired electrical signal proportional to the pressure on the shaft is derived. It can be seen that as tension is created in cable 32, the drum containing the cable will bear on the stationary shaft about which it rotates with a pressure proportional to the tension, and consequently, the shaft will be caused to be strained accordingly by incremental amounts and will change its cross-sectional dimensions proportionally. The transducer located within the cavity in the shaft is subjected to these small incremental changes and is also strained accordingly. Thus the dimensions of the transducer are changed by an amount directly proportional to the amount of pressure applied to the shaft and drum, which is also proportional to the amount of tension in the cable. As will be described hereinafter, the axis of the transducer is disposed along a preferred line in relation to cable 32 to produce a maximum signal. (However, for all practical purposes, the axis of the transducer can be disposed within the cavity in the shaft at any orientation except at an angle of 45° with the resultant load and still produce an electrical signal which is directly proportional to the instantaneous magnitude of tension in the cable. At an angle of 45° to the resultant load, there is a node of no deflection in the shaft. The preferred line of orientation simply provides an increased sensitivity and, consequently, a larger output signal.) Moreover, there are preferred embodiments of the transducer which also increase the sensitivity and output thereof, although any suitable transducer that responds to the small incremental changes in the dimensions of the shaft will provide the necessary results.

The cable is reeled on and off the cable drum by means of a suitable gear, and a brake is used to stop the drum, when desired. Although any means can be used to accomplish these results, they form no part of the present invention. For example, a suitable gear 44 is shown engaged with a toothed rim 40 of the drum, whereby the gear can be driven in either direction to take up or let out the cable. A suitable brake band 46, for example, can be provided about the other rim 42 of the drum, as shown, and can be tightened by a suitable mechanism such as brake handle 48 to stop the drum after cable is let out or to hold it at rest.

Figure 2:
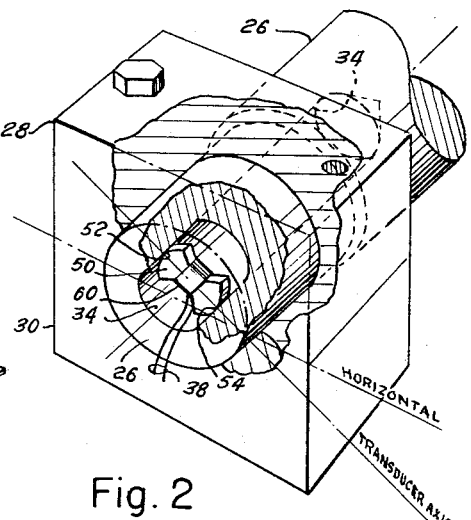
FIGURE 2 is a perspective view, partly cut away, showing the end of the stationary shaft rigidly supported between mounting blocks and the strain responsive means mounted within a cavity provided in the end of the shaft.

An enlarged and more detailed perspective view, partly cut away, of the shaft including the drilled out end portion thereof is shown in FIGURE 2 and also shows the strain transducer for measuring the tension in the cable fitted in the shaft cavity. Conventionally, the outside diameter of the end of the shaft 26 defines a shoulder to fit between the mounting blocks 28 and 30, the latter of which are suitably bolted together to rigidly hold the shaft in a stationary position. According to the invention, a portion of the length of the stationary shaft is drilled out from its end to form a slightly tapered cavity 34, and a strain transducer 36 of a suitable configuration is force fitted therewithin. The preferred embodiment of the transducer will be described in more detail later, but briefly comprises a metal supporting member 50 having two opposite rounded and slightly tapered ends 52 and 54, with the rounded ends having a radius of curvature less than the radius of curvature of the cavity within which it fits. Preferably, the cross-section of the shaft defines a perfect circle, and the depth thereof is much greater than the thickness of the transducer so that the circular cross section of the shaft engaged by the transducer can be considered as a ring. The cavity and the rounded ends of the transducer are slightly tapered inward toward the center of the shaft so that very close manufacturing tolerances need not be observed in making the proper fit between the two. Thus because of the tapered cavity, a similarly tapered transducer whose overall width is slightly less than the diameter of the cavity at the end of the shaft can be accurately and snugly fitted within the cavity a short distance from the end of the shaft.

As the cable is reeled off the drum at a particular angle relative to the horizontal, the axis of the transducer, which is the line passing along its length between the intersection points of the transducer and the walls of the cavity as shown, is preferably oriented at approximately the same angle with the horizontal, although a deviation of this angle is sometimes preferred as will be described hereinafter. As the dimensions of the shaft and cavity change by incremental amounts as a result of pressure and forces applied thereto, the transducer dimensions change accordingly. Suitable strain gages, to be described below, are mounted on the transducer support member 50 and protected by a suitable cover or potting compound 60, and are also strained accordingly, whereby these gages provide an electrical output signal which is proportional in magnitude to the tension in the cable.

Figure 3:
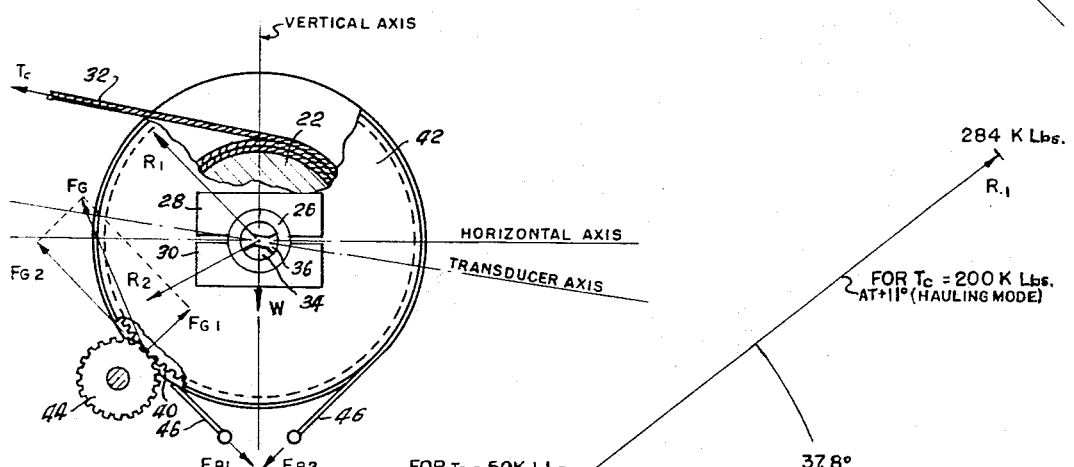
FIGURE 3 is an end view of the winch shown in FIGURE 1 and schematically illustrates the various vector forces acting on the winch system.

A side elevational view, partly cut away, of the shaft and drum, including the transducer, is shown in FIGURE 3 to illustrate the various forces acting on this system and resultant force exerted on the transducer. For present purposes, it will be assumed that the cable 32 is reeled on and off the drum 22 at a small positive angle with respect to the horizontal, with the cable represented by a tension $T_C$ acting on the drum along the line of the cable. The combined weight W of the cable and drum also bears vertically down on the stationary shaft 26. For conventional operation of the winch system, there are at least two modes of operation. One mode is referred to as the hauling mode when the cable is being reeled in to take up cable and to increase the tension thereof. This is effected by means of the driving gear 44 engaging the rim 40 of the drum. In this particular mode, the gear exerts a force $F_G$ on the rim of the drum which can be represented by two perpendicular components, one component $F_{G1}$ which acts radially inward and the other component $F_{G2}$ which acts along a tangent to the rim. Vectorial addition of all of the forces acting on the stationary shaft at any one instant of time yields the resultant force acting on the shaft, and a force proportional to this resultant is exerted on the transducer. For the hauling mode just described and with the forces acting approximately at the angles shown, the resultant force $R_1$ acting on the transducer is directed up from the horizontal approximately as shown. Another mode of operation is the braking mode, wherein the brake band 46 is tightened around the other rim 42 of the drum to stop the cable from being reeled out further when the predetermined tension is attained. In this mode of operation, the brake exerts two tangential forces $F_{B1}$ and $F_{B2}$ on the drum whose magnitudes are conventionally different, depending upon the brake configuration and structure. Usually, the force $F_{B2}$ opposite the cable is from about 12 to 30 times greater than $F_{B1}$. When these two forces are added vectorially to the weight of the drum and cable and the tension on the cable, another resultant force $R_2$ acts downward from the horizontal on the transducer approximately as shown.

The foregoing description of the vectorial forces acting on the winch system and transducer shows, for purposes of illustration only, the manner of determining the net resultant force on the transducer by using vector addition, wherein the exact angles and magnitudes of the forces as shown should not necessarily be considered accurate or exact. Moreover, this illustration serves to show the approximate or preferred orientation of the transducer axis in relation to the horizontal and the cable angle as it is wound off the drum. If the cable is wound vertically downward off the drum, as is the case in some off-shore winch systems, the transducer axis would be situated at approximately 90° to its present location. It will be noted from FIGURE 3 that the axis of the transducer is not along the line of the cable or along the line of the net resultant force acting thereon. Rather, since the resultant force acting on the transducer when the winch is in the hauling mode changes from a positive angle above the horizontal to a negative angle below the horizontal when the system is switched to the braking mode, it is found desirable to achieve a more sensitive and linear output to situate the axis of the transducer approximately halfway between these two resultant force directions.

Figure 4:
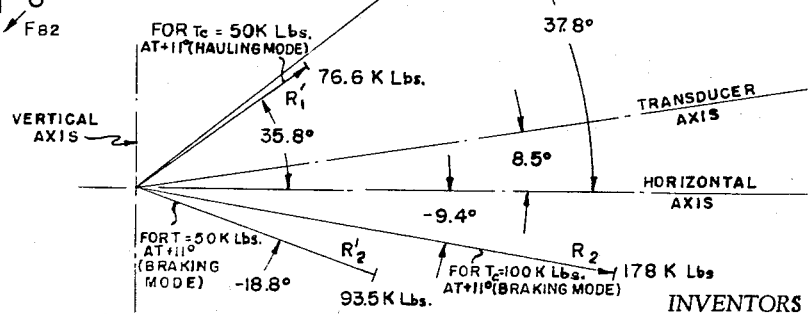
FIGURE 4 is a schematic diagram illustrating the net vector forces acting on the strain responsive means in response to various cable tensions and operational modes of the winch.

To further illustrate the magnitudes and directions of the various forces acting on the system, some specific examples are set forth below and described in conjunction with the vector diagram of FIGURE 4. Referring to FIGURE 4, the transducer is disposed within the cavity of the stationary shaft with its axis at an angle of 8.5° above the horizontal axis. In this particular example, the cable is held in tension off the drum of the winch at an angle of 11° above the horizontal. For a tension of 200,000 pounds on the cable, a total weight of the drum and cable acting vertically downward on the shaft of magnitude equal to 30,000 pounds, and a total driving force $F_G$ of 168,000 pounds exerted by the gear on the rim of the drum at an angle of 50° above the horizontal in the hauling mode, the total resultant force $R_1$ acting on the transducer is 284,000 pounds acting at an angle of 37.8° above the horizontal, as shown. For the same conditions except for a tension in the cable of 50,000 pounds, the total resultant force $R_1$ acting on the transducer is 76,600 pounds acting at an angle of 35.8° above the horizontal. Again, for the same conditions but with a tension in the cable of 100,000 pounds and a braking force $F_B$ (vector addition of components $F_{B1}$ and $F_{B2}$) of 87,000 pounds acting on the rim of the drum at an angle of 13° below the horizontal when in the braking mode (no driving gear force), the resultant force $R_2$ acting on the transducer is 178,000 pounds acting at an angle of 9.4° below the horizontal. Finally, with the same conditions in the braking mode but with a tension in the cable of 50,000 pounds, the resultant force $R_2$ acting on the transducer is 93,500 pounds acting at an angle of 18.8° below the horizontal. From this vector diagram, it can be seen that the transducer axis is purposely situated along a line approximately halfway between the maximum angles of hauling and braking, wherein these angles are approximately predeterminedly known prior for the particular operation to be undertaken, so that the transducer will more accurately reflect a linear relationship between all of the forces measured and its resultant force. In fact, it can be shown that the magnitude of the resultant force acting on the transducer bears a very nearly linear relationship with the magnitude of the tension in the cable whether in the hauling or braking mode. Any excessive non-linearity can be compensated for in the signal conditioning and read-out apparatus.

Figure 5:
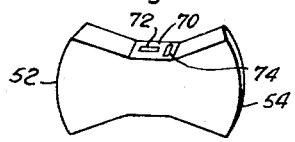
FIGURE 5 is a perspective view of one preferred embodiment of the strain responsive means that is mounted in the cavity of the stationary shaft.

A preferred embodiment of the strain responsive means used within the cavity of the shaft is shown in the perspective view of FIGURE 5 and comprises a rigid support member generally designated 50 having two rounded ends 52 and 54 each of radius of curvature slightly smaller than the circular cavity in the shaft, with the overall length of the member being approximately equal to the diameter of the cavity at the transducer mounting depth. The member 50 defines a central restricted portion 70 intermediate the two curved ends, so that forces applied inward on the two ends results in an increased or magnified strain at the constricted portion. As more or less force is applied to the stationary shaft of the winch system, its dimensions change accordingly by incremnetal amounts which cause the dimensions of member 50 to be changed by correspondingly incremental amounts. Suitable means are provided on the constricted portion of the member 50 to measure the incremental amounts of strain within the member, which means preferably comprises strain gages mounted in preferred orientations on the constricted portion of member 50. Specifically, semiconductor strain gages are preferred, such as silicon, for example, because of the increased sensitivity and gage factor. As shown in FIGURE 5, a pair of strain gages 72 and 74 are mounted on the top side of the constricted portion 70 perpendicular to each other, and similarly, two additional strain gages (not shown) are mounted on the bottom side of the constricted portion. All of the strain gages are preferably interconnected by wires (not shown) to form an electrical bridge circuit, which is common practice when using a plurality of gages.

Figure 6:
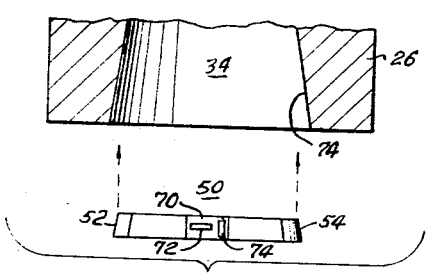
FIGURE 6 is a top view, partly cut away, of one end of the stationary shaft and the strain responsive means illustrating the manner in which the strain responsive means is fitted within the shaft cavity.

A top cut away view of the shaft end and the transducer is shown in FIGURE 6 to illustrate the fitting of the member 50 within the shaft cavity. Because of the slightly tapered character of the two ends 52 and 54 of the transducer and the tapered interior wall 74 of the cavity 34, member 50 is easily positioned within the cavity with a snug fit without necessity of observing extremely close machine tolerances. The member is fitted tightly into the cavity by applying a measured amount of force with any suitable means or tool, and because of the force fit of the member in the cavity, the strain gages will be biased in the absence of cable tension.

Figure 7:
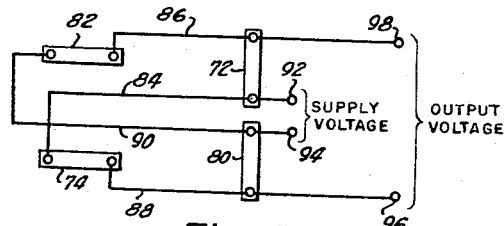
FIGURE 7 is a schematic illustration of a plurality of strain gages forming a part of the strain responsive means, wherein the gages are connected in an electrical bridge circuit for measuring the pressure on the stationary shaft.

A bridge circuit comprising four interconnected strain gages is preferably used in conjunction with member 50 for increased sensitivity, wherein bridge circuits of this nature are commonly used for force and deflection measurements. The interconnections between various strain gages and the relative orientations thereof are shown in the schematic diagram of FIGURE 7, wherein the bridge circuit comprises four strain gages 72, 74, 80 and 82, two of which are parallel to a first axis parallel with the axis of member 50 and the other two of which are perpendicular to the first two. When used in conjunction with the transducer shown in FIGURE 5, two of the strain gages are mounted on top of member 50 perpendicular to each other with one parallel to the transducer axis and the other perpendicular thereto. The two additional strain gages are similarly mounted on the bottom side (not shown). As in FIGURE 7, two of the strain gages 72 and 74 which are perpendicular to each other are electrically connected at two of their ends by a wire 84, and the other two perpendicular strain gages 80 and 82 are electrically connected by a wire 90. Strain gage 80 which is perpendicular to strain gage 74, is connected at its other end to the other end of strain gage 74 by means of wire 88. Similarly, strain gage 82, which is perpendicular to strain gage 72, is electrically connected at its other end to the other end of strain gage 72 by wire 86. A supply voltage is applied to the bridge circuit by connecting supply voltage terminals 92 and 94 to the interconnections of strain gages 74 and 80 and strain gages 72 and 82, respectively. Similarly, the output voltage is derived from the bridge by connecting terminals 96 and 98 to the interconnection of strain gages 72 and 74, and the interconnection of strain gages 80 and 82, respectively. It will be apparent to those skilled in the transducer art that the situating of two of the strain gages perpendicular to the other two produces more desirable results than a random orientation of the gages. Specifically, as the member 50 on which the gages are mounted is compressed along its axis, strain gage 72 as shown in FIGURE 5 will also be compressed, as will the parallel strain gage 80 mounted on the opposite side. Because of the compressive strain on the member 50, it will increase its thickness along the length of transducer 74, thus causing gage 74 and the parallel gage 82 mounted on the opposite side thereof to undergo a tensile strain. When gages which are parallel are mounted in opposite arms of the bridge as shown, the compressive strain of two parallel gages adds to the tensile strain of the opposite gages. Of more importance, however, is the fact that there will be an automatic compensation of all thermally caused resistance changes in the gages when connected in the bridge in this manner. That is to say, if the member 50 on which the gages are mounted contracts or expands slightly as a result of a temperature change, the overall effect on the bridge output voltage will be almost completely canceled because each gage experiences an identical thermal change.

Figure 8:
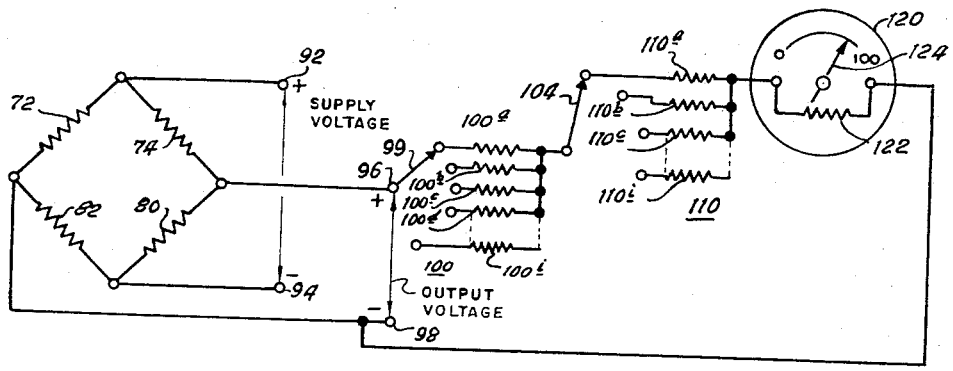
FIGURE 8 is an electrical schematic diagram of the bridge circuit shown in FIGURE 7 coupled into signal conditioning equipment for the direct readout of the tension in the cable or chain of the winch.

An electrical schematic diagram of the bridge circuit comprised of the four strain gages is shown in FIGURE 8 in conjunction with signal conditioning circuitry and readout means for measuring the tension in the cable. As remarked earlier, parallel strain gages 72 and 80 are situated on opposite sides of the bridge, and similarly, parallel strain gages 74 and 82 which are perpendicular, respectively, to the other two strain gages are also mounted on opposite sides of the bridge. The simplest method of readout of tension in the cable is to connect the electrical output of the transducer to a suitable microameter and read the deflection of the meter as it responds to the unbalance of the bridge. It will be remembered that there are several operational modes of the winch system, such as the hauling mode, braking mode, and, in some instances, a pawl will be inserted into the winch drum gearing to hold the drum stationary. Chain-stopper pawls may also be inserted into anchor chains to hold the chains stationary and identical transducers may be used to measure the tension. However, for the present discussion, only two modes of operation will be discussed, namely, the hauling and braking modes. According to the vector diagram of FIGURE 4, the resultant force acting on the transducer changes magnitude and direction between hauling and braking modes. The resultant force also varies in magnitude and direction according to several other variables. Thus, the resultant force also varies according to the direction of the cable relative to the horizontal, and also according to the total dead weight acting on the shaft which varies according to the number of layers of cable wound around the drum. Another variable affecting the resultant force acting on the transducer is the lateral location of the cable between the two edges of the drum as it comes off the drum. This is to say, as the cable is reeled on and off the drum, it travels back and forth across the drum as would a fishing line on a reel. This causes the moment arm between the force represented by the cable tension and the ends of the stationary shaft where the force is exerted to vary. All of these variations must be taken into account by "conditioning" the signal derived from the transducer to cause the proper deflection on the readout meter. For example, a different direct reading from the transducer will be measured for different numbers of layers of cable on the drum as a result of the change in weight acting on the stationary shaft. Similarly, different readings will be directly measured from the transducer as a consequence of changing from one operational mode to the other.

To condition the signal such that the ultimate readout signal will accurately reflect the tension in the cable, the output of the strain gage bridge circuit is connected into signal conditioning compensation switches which comprise various resistance values as shown in FIGURE 8. The output signal from the bridge circuit between terminals 96 and 98 is connected into a first switch 100 which compensates for changes of the moment arm discussed above and the weight of the drum acting on the stationary shaft. This switch comprises several resistors 100a–100i. When a given number of layers of cable are wound about the drum, which represents a given weight which can be calculated from the weight of a single turn of cable, the output signal is directed through a selected one of the resistors of switch 100 by means of switch pole 99, such as shown connected to resistor 100b, for example. As the cable is reeled in or out as the case may be, switch pole 99 can be switched from one resistor to another to compensate for the different layers of cable. As many resistors as are needed can be provided to properly condition the signal and to handle as many layers of cable as desired. The values of the resistors are calculated by knowing the various resistances within the bridge, the bridge supply voltage and readout meter characteristics. After the signal passes through switch 100, it is coupled into another signal conditioning switch 110 comprised of several more resistors 110a–110i. This signal conditioning switch compensates for the particular operational mode of the winch system. For example, some of the resistors 110a–110i can represent different total tensions in the cable for the hauling mode, whereas the remainder of the resistors can represent different tensions in the cable for the braking mode. Thus, switch 110 can be selected to pass the current through the proper resistor by means of switch pole 104 to maintain the total output current through the resistor at the proper level to actuate the readout meter. Finally, the signal from switch 110 is connected to a suitable microameter 120, wherein the current passes through a shunt resistor 122 located within the meter. The scale of the meter is calibrated as desired such that the needle 124 will deflect to indicate the tension directly in the cable. The needle is maintained on scale by switching between various resistors in the two signal conditioning switches 100 and 110.

Figure 9:
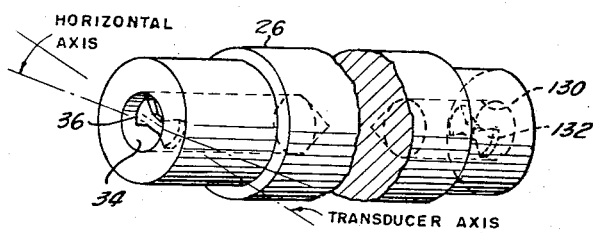
FIGURE 9 is a perspective view, partly cut away, of a stationary shaft having a strain responsive means mounted within cavities in each end of the shaft.

Although it has been found that a single transducer disposed in one end of the stationary shaft of the winch system is adequate to provide a readout of the tension in the cable, it will be recognized that the cable, as it is wound in or let out in the hauling mode, will travel back and forth across the lateral width of the cable drum. Consequently, the moment arm and thus the resultant force acting on the transducer will vary to reflect the lateral position of the cable on the drum. To compensate for this and to further increase the accuracy of the system, transducers can be provided in both ends of the shaft such as shown in the perspective view, partly cut away, of the shaft of FIGURE 9. In this case, another transducer 132 is disposed within another cavity 130 provided in the other end of the shaft just as described before. Preferably, only two strain gages are mounted on the transducer 36 in one end of the shaft, and another two gages are mounted on the other transducer 132 in the other end of the shaft, wherein it is desirable that the two strain gages mounted on transducer 36 be perpendicular to each other and on opposite sides and two gages on transducer 132 being perpendicular and on opposite sides. The same electrical interconnections between the four transducers are again observed to conform to the electrical schematic diagram of FIGURE 8 and the electrical hook-up shown in FIGURE 7. As the cable travels back and forth across the drum, the output from the transducer's bridge represents an average between the two extremes caused by the change of moment arm and provides a more accurate reading during the hauling mode of operation.

It will be recognized that any suitable strain transducer can be used in the end or ends of the dead shaft, whereby the foregoing description relates to a preferred embodiment of a suitable transducer for this purpose. It has been found in some applications, however, that minimum specifications must be met regarding the amount of pressure of force the stationary shaft must withstand when it is supported between the mounting blocks. In some cases, in fact, it may be found that by drilling out the ends of the shaft reduces its structural strength below the specified minimum which is found to be acceptable. In this case, another type of transducer has been devised to provide the same results as described earlier but which reinforces the structural strength of the shaft after the cavity has been machined out. Such a transducer is shown in the side elevational view, partly in section, of FIGURE 10 and will be referred to as a shaft insert type transducer. Again, the end of the stationary shaft is drilled out to form the same cavity as before, but in this instance, the transducer comprises a slightly tapered cylinder 140 to fit within and match the dimensions of the cavity. The transducer 140 comprises two sections 142 and 144, each being a slightly tapered cylinder of solid metal, with section 142 having an integral threaded stud 146 to be screwed into a matching threaded stud hole 148 provided in section 144. A member 150, to be described below, is placed between the two sections before they are screwed together and is secured therebetween when the two sections are screwed together. Member 150 is also tapered slightly with its outer end being slightly larger in diameter but very nearly flush with the tapered walls of the cylindrical transducer. As the dead shaft is caused to be compressed to change its dimensions by incremental amounts, member 150 responds exactly as did member 50. However, the cylindrical shaft insert type transducer comprising sections 142 and 144 replaces the drilled out portion of the shaft so that the overall structural strength is very nearly the same as a solid shaft.

Figure 10:
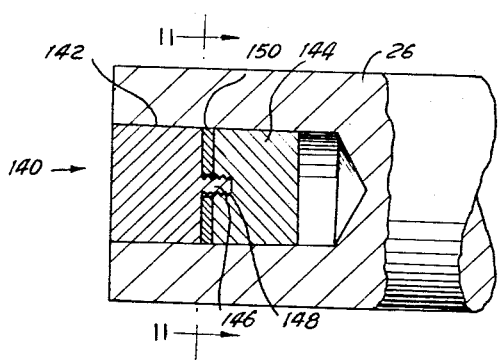
FIGURE 10 is a side elevational view, partly in section, of one end of a shaft utilized in a winch system showing an alternate embodiment of a strain responsive means inserted within the cavity of the shaft.
Figure 11:
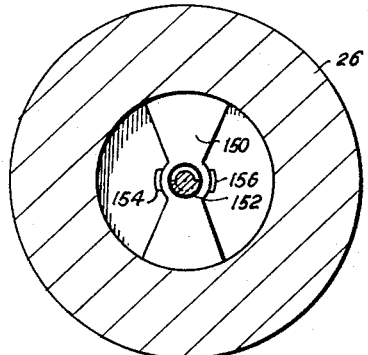
FIGURE 11 is an elevational view in section taken across section lines 11—11 of FIGURE 10 showing in more detail the strain responsive means utilized in the embodiment of FIGURE 10.

Member 150 is shown in a side elevational view of the section view of FIGURE 11 taken across section lines 11—11 of FIGURE 10 and comprises a support member 150 similar to that described in conjunction with FIGURE 5 having an opening 152 through the center thereof for the passage of the threaded stud 146 therethrough. In this case, the curved ends of the transducer 150 have the same radius as the recess within the shaft. Member 150 also defines a restricted central portion on which several strain gages, such as gages 154 and 156, can be mounted and interconnected as before.

Another embodiment of the transducer for being disposed in a cavity in a stationary shaft is shown in the side elevational view, partly in section, of FIGURE 12, wherein this particular transducer is non-directional in the sense that, regardless of the direction of the resultant force acting on the shaft, the transducer will read this resultant force without reference to the particular direction thereof. Again, a cavity 160 is defined in the end of the shaft 26 and filled with a suitable fluid 162. The fluid is sealed within the recess by any suitable wall 164 with a transducer 166 passing through an aperture 165 in the wall. The transducer comprises a rigid member 167 having a diaphragm 168 located on one end within the fluid with a suitable strain gage or bridge of strain gages 170 cemented or fixed to the back side of the diaphragm opposite the fluid. As more or less force is exerted on the stationary shaft as a result of the cable tension, a proportional pressure is created within the fluid which is uniformly transmitted to the diaphragm and causes it to deflect an incremental amount. The strain gages 170 respond to pressure in terms of a bending moment, and an electrical output signal is derived from leads 174 connected to the strain gages which pass through hole 176 of member 166. Since the pressure created within the fluid is transmitted uniformly throughout regardless along which axis of the stationary shaft deflects, the transducer will measure the shaft force without reference to direction. The desirability of this feature is apparent, since the electrical output signal of the transducer varies only with the magnitude of the resultant load.

Application of the invention to a chain type winch is shown in FIGURES 13 and 14, where FIGURE 13 is a side elevational view, partly cut away, of a chain winch drum used with a pawl for being inserted in the chain for holding it at rest, and FIGURE 14 is a top view, partly cut away, of the pawl in its inserted mode. The chain winch comprises a pocketed load chain sheave 200 which is supported by and rotates about a stationary shaft 206 passing through the center thereof. The shaft is mounted, as before, at each end between mounting blocks 211 and 212. The drum of the winch also has outer rims 202 and 204, as described earlier, in which a driving gear and brake (neither shown) are engaged, respectively. A chain 210 passes over the winch drum and is engaged at each of its links with the pocketed load chain sheave as it passes thereover, so that as the drum is driven by a suitable gear, the chain will be reeled in and out accordingly. The supply of chain is not wound about the drum as in the cable winch, but is contained elsewhere, as in the hold of a drilling vessel, for example.

Assuming the chain is attached to an anchor as was the cable described earlier, a tension T will exist in the chain and be directed along the line thereof. In the drawing, the chain is horizontal as is the line of the tension which acts on the stationary shaft 206. Also, the weight of the drum acts vertically downward on the shaft. Again, one end of the shaft defines a cavity into which a strain responsive means 208 is disposed, as before. To ascertain the proper axis along which the strain responsive means should be aligned, all of the forces acting on the shaft are vectorially added to determine the resultant. In this particular case, the tension T is normally much greater than the weight W, so that it can be seen that the direction of the resultant force is essentially constant, and the magnitude thereof varies as the magnitude of the tension T. The strain responsive means is then aligned along the axis as closely as possible, wherein this axis will be situated at a small angle with respect to the horizontal. The transducer axis shown in FIGURE 13 is for illustrative purposes only and should not necessarily be considered exact. Moreover, the actual strain gages and wires attached to member 208 are now shown for purposes of simplicity, although it will be recognized that strain gages are mounted on the member as described earlier. It is apparent that the weight of the drum of the chain winch does not vary as more or less chain is played out as was the case in the cable winch, and that the chain does not travel laterally back and forth across the drum. Consequently, the electrical signal from the transducer does not require as much "conditioning," and it will be seen that the transducer output is essentially a function only of the magnitude of the chain tension in any one mode of operation. The effectiveness of the transducer in measuring the tension in this system is thus apparent.

In some chain winches, the chain is merely passed over the drum to change directions and is driven by a separate means, not shown. In this case an equal tension T will exist in the chain directed vertically downward as shown, and when the two tensions and weight are added vectorially, the axis of the transducer will be seen to be at about 45° to the horizontal. It will be further noted that in this case, the resultant acting on the transducer is a function only of the magnitude of the tension without regard to which mode of operation, whether hauling, braking or pawl inserted, the winch is in.

When chain handling winches are used, normally a chain-stopper is simultaneously employed for static use. To hold the chain at rest and in tension, the chain stopper pawl 216 is inserted in a link of the chain within a grooved guide member 214 through which the chain passes. The pawl is supported about another stationary shaft 218 and can rotate thereabout. When the pawl is inserted, as shown in both FIGURES 13 and 14, the end 222 thereof bears against one link of the chain, whereby the chain is then restrained between the pawl and guide. The chain has a tendency to reel out toward the right in the figure and cannot move, since the stationary shaft 218 and guide 214 are fixed in relation to each other and in relation to the platform on which the winch and chain stopper are mounted. The tension T in the chain acts as a compressive force on the pawl with a magnitude of $T \cos a$, where $a$ is the angle between the line of the chain (horizontal) and the central axis of the pawl. A strain responsive means 220 is also disposed within a cavity of the stationary chain stopper shaft 218 and is aligned along the central axis of the pawl. Obviously, the direction of the resultant force acting on the transducer never changes, whereby the magnitude varies as a function of the magnitude of the chain tension. Thus, provision is made for measuring the tension in a third mode, namely the pawl inserted mode when the chain is at rest. It can be seen that the same structure can be used to measure the tension in the cable of a cable winch in a pawl inserted mode, wherein a pawl would be inserted in the gear on the winch drum which would hold the cable at rest.

Although the invention has been described with reference to specific embodiments applied to winch systems, it will be readily apparent to those skilled in the art that certain modifications and substitutions, including applications to different apparatus, can be made without departing from the true scope of the invention, which is to be limited only as defined by the appended claims.

What is claimed is:

1. A system for supporting a rotatable member, comprising:
    (a) a cylindrical shaft for being inserted through said rotatable member along the axis thereof and defining a cavity in an end thereof which is subject to incremental changes in dimensions in response to pressure variations exerted on said shaft by said rotatable member,
    (b) said cavity being circular in cross-section and tapered inward from the end of said shaft concentric with the axis thereof and,
    (c) a transducer disposed within said cavity having a pair of opposing curved ends abutting the walls of said cavity with said ends being tapered to match the taper of said cavity, and being strained in response to said incremental changes in dimensions of said cavity,
    (d) said transducer having strain gage means mounted thereon which is strained in proportion to the strain applied to said transducer.

2. A system for supporting a rotatable member, comprising:
    (a) a cylindrical shaft for being inserted through said rotatable member along the axis thereof and defining a cavity in an end thereof which is subject to incremental changes in dimensions in response to pressure variations exerted on said shaft by said rotatable member,
    (b) said cavity being circular in cross-section and tapered inward from the end of said shaft concentric with the axis thereof,
    (c) a first circular cross-section, tapered member disposed within said cavity and substantially filling a first part thereof along the axis of said shaft,
    (d) a second circular cross-section, tapered member disposed within said cavity and substantially filling a second part thereof along the axis of said shaft,
    (e) a third member disposed within said cavity between said first and said second members in abutting relation to the walls of said cavity and being strained in response to said incremental changes in dimensions, and
    (f) strain gage means mounted on said third member which is strained in proportion to the strain applied to said third member.

3. A system according to claim 1 wherein said transducer defines a constricted region intermediate said opposing ends on which said strain gage means is mounted.

4. A system according to claim 1 wherein the length of said cavity along the axis of said shaft is much greater than the thickness of said transducer along said axis.

5. A system for supporting a rotatable member, comprising:
    (a) a cylindrical shaft for being inserted through said rotatable member along the axis thereof and defining a cavity in an end thereof which is subject to incremental changes in dimensions in response to pressure variations exerted on said shaft by said rotatable member,
(b) said cavity having opposite walls tapered inward from the end of said shaft, and
(c) a transducer disposed within said cavity having the opposite ends thereof abutting the opposite walls, respectively, of said cavity with said opposite ends tapered to match the taper of said opposite walls, and being strained in response to said incremental changes in dimensions of said cavity,
(d) said transducer having strain gage means mounted thereon which is strained in proportion to the strain applied to said transducer.

References Cited
UNITED STATES PATENTS

| | | | |
|---|---|---|---|
| 3,184,963 | 5/1965 | Dahle | 73—141 XR |
| 3,203,234 | 8/1965 | Westcott et al. | 73—141 |
| 3,224,262 | 12/1965 | Shipley | 73—136 |
| 3,248,937 | 5/1966 | Vincent | 73—88.5 XR |
| 3,260,106 | 7/1966 | Hull et al. | 73—144 XR |
| 3,273,382 | 9/1966 | Fonash | 73—12 XR |

RICHARD C. QUEISSER, *Primary Examiner.*

C. A. RUEHL, *Assistant Examiner.*